No. 897,045.　　　　　　　　　　　　　PATENTED AUG. 25, 1908.
B. F. YOUNG.
TRACK LEVEL.
APPLICATION FILED APR. 19, 1907.
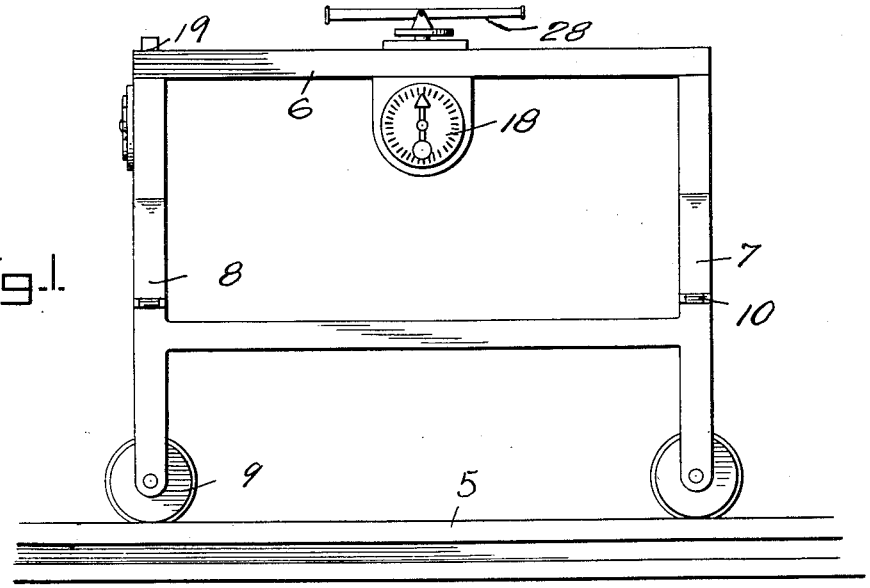
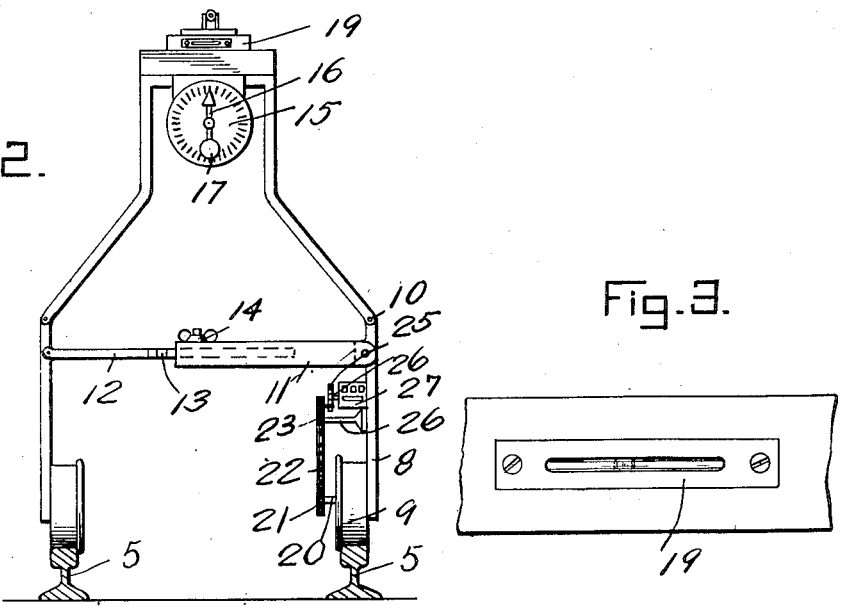
WITNESSES:
INVENTOR
B. F. Young
BY
Attorneys

UNITED STATES PATENT OFFICE.

BENJAMIN F. YOUNG, OF LEAVITT, TEXAS.

TRACK-LEVEL.

No. 897,045.  Specification of Letters Patent.  Patented Aug. 25, 1908.

Application filed April 19, 1907. Serial No. 369,110.

*To all whom it may concern:*

Be it known that I, BENJAMIN F. YOUNG, a citizen of the United States, residing at Leavitt, in the county of Haskell, State of Texas, have invented certain new and useful Improvements in Track-Levels; and I do hereby declare the following to be a full, clear, and exact description of the invention, such as will enable others skilled in the art to which it appertains to make and use the same.

This invention relates to track leveling instruments and has for its object to provide a leveling instrument of this class which may be moved over a section of track to determine irregularities in the roadbed, the rise and fall of the track, and the gage of the rails.

In carrying out my invention I employ a truck carrying indicating device for indicating the rise and fall of the track and for determining irregularities in the roadbed, means for indicating the distance traveled which means can of course be used to determine the extent of any rise or fall in the track or roadbed and also the extent of any irregularities. The truck furthermore includes standards which are hinged and are connected by telescopic rods one of which is calibrated so that any deviation from the standard gage of the track rails may be determined.

In the accompanying drawings, Figure 1 is a side elevation of the instrument, Fig. 2 is a rear elevation thereof, and, Fig. 3 is a detail view of one of the leveling devices employed in connection therewith.

In the drawings there is shown a pair of track rails 5 upon which the instrument embodying my invention is designed to travel. The said instrument is in the form of a truck including a top 6 supported by front and rear pairs of standards 7 and 8 respectively at the lower ends of which are journaled wheels 9 which travel upon the said track rails. The rear pair of standards 8 are formed in hinged sections as indicated at 10 and the movable sections of these standards are connected in a manner which will now be described. A sleeve 11 is formed integral with one member 8 and projects inwardly past the middle of the truck and a rod 12 projects inwardly from the other of the members 8 and is telescopically received in the sleeve 11 and is provided with calibrations 13. A set screw 14 is engaged through the sleeve member 11 adjacent its inner end and is adapted to impinge against the rod 12 to hold the movable sections of the standards in spread relation and at a degree corresponding to the standard gage of track it being understood that any deviation from this standard gage will cause the rear wheels either to bind or to tend to leave the track rails.

In order that the irregularities in the roadbed may be indicated, I have provided at the rear end of the machine a calibrated dial 15 upon the face of which is pivoted a pointer or indicator 16 which is weighted at its lower end as indicated by the numeral 17, this weighted lower end of the indicator serving to normally hold the same in vertical position and in order that any rise and fall in the grade of the roadbed may be determined I have provided a similar indicating device 18 upon one side of the truck substantially at the middle thereof. To further aid in determining irregularities in the roadbed I have provided upon the truck at its rear end a spirit level 19.

In order that the distance traveled may be determined, I have provided upon one of the wheels 9 at the rear end of the truck an integral shaft 20 carrying a sprocket gear 21 over which passes a sprocket chain 22. The sprocket chain also passes over a sprocket gear 23 rotatably mounted upon a stub shaft 24 and the said sprocket 23 has formed integral with it a finger 25 which is adapted to contact, at each revolution of the sprocket, with a spur wheel 26 which forms a portion of an indicator 27 for indicating the distance traveled by the truck. I also preferably mount upon the top of the truck a surveyor's level 28.

What is claimed is:—

1. A track gage comprising a body, supporting sides hinged to the body and including standards, track wheels journaled at the lower ends of the standards, an inwardly projecting sleeve member carried by one standard, and a rod carried by the opposing standard and received in said sleeve, the rod being provided with scale marks.

2. A track gage comprising a body, supporting sides hinged to the body and including standards, track wheels journaled at the lower ends of the standards, an inwardly projecting sleeve member carried by one standard, a rod carried by the opposing standard and received in said sleeve, the rod being provided with scale marks, and a set screw carried by the sleeve whereby the rod may be held at adjusted position within the sleeve.

In testimony whereof, I affix my signature, in presence of two witnesses.

BENJAMIN F. YOUNG.

Witnesses:
A. TONN,
EMMET CONDEE.